Feb. 16, 1932.  R. PARRISH  1,845,679
CABLE CONNECTION
Filed July 17, 1930
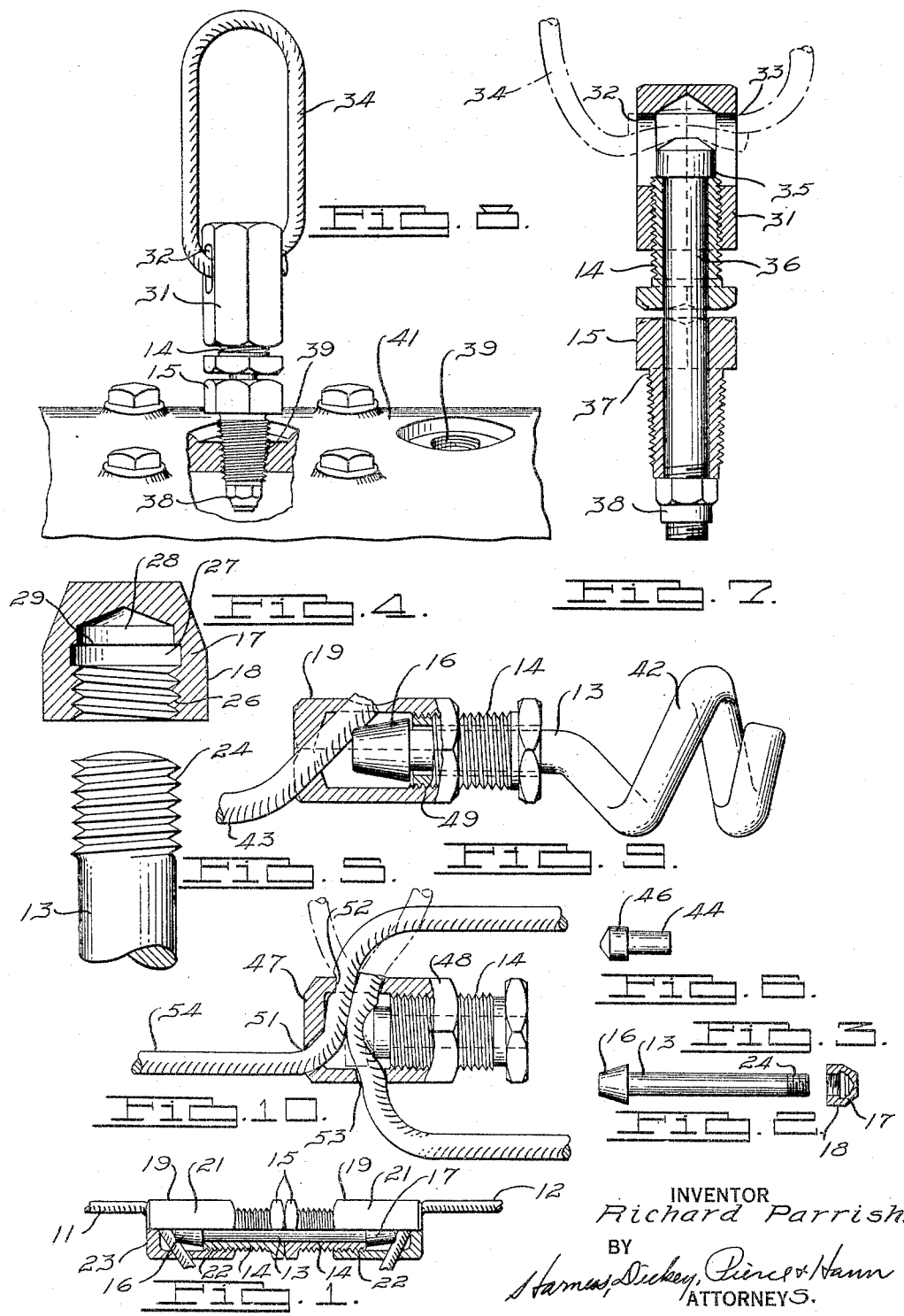
INVENTOR
Richard Parrish.
BY
ATTORNEYS.

Patented Feb. 16, 1932

1,845,679

UNITED STATES PATENT OFFICE

RICHARD PARRISH, OF DETROIT, MICHIGAN, ASSIGNOR OF ONE-THIRD TO HARRY N. LEVIN AND ONE-THIRD TO WILLIAM C. BENNETT, BOTH OF DETROIT, MICHIGAN, AND ONE-THIRD TO JOHN A. BEDFORD, OF ROYAL OAK, MICHIGAN

CABLE CONNECTION

Application filed July 17, 1930. Serial No. 468,590.

This invention relates to cable connections, and it has particular relation to such cable connections as are adapted to be quickly and detachably secured to a cable end in order to adapt said end for connection to another member.

One object of this invention is to provide a simple dependable means for quickly joining two cables together or for splicing a broken cable.

Another object is to provide a connection for a cable which may be securely fastened thereto by a simple and quick operation, and to which the cable may be simply, quickly and effectively secured to form a standing loop or bight in the same.

Another object is to provide a cable end connection which may be clamped to an end of a cable and which is provided with a helical end portion with which the cable may be quickly and effectively engaged to form a running loop or noose in the same.

Another object is to provide a suitable connection between a cable and a screw-threaded portion of a member to be manipulated by the cable, and further to provide a swivel in the cable connection so that the member engaged can be rotated relative to the cable.

Another object of my invention is to provide means whereby a hoist cable can be connected to the spark plug hole of an internal combustion engine in a quick and positive manner so that the engine may be quickly and easily moved about.

Another object is to provide easily and cheaply manufacturable mechanisms to carry out the above and other objects in a positive and satisfactory manner.

Numerous other objects, and features of novelty will be either specifically pointed out, or will be apparent, upon reading the accompanying specification, claims, and drawings, which describe and show an illustrative embodiment of my invention.

The above being among the objects of the present invention, the same consists in certain features of construction in combination with parts hereinafter described with reference to the accompanying drawings, and then claimed, having the above and other objects in view.

Like reference numerals apply to like parts throughout the various figures of the drawings, in which:

Fig. 1 is an elevational view of an illustrative embodiment of my invention as used as a cable splice, the outer portions of which are shown as being partially broken away to show details of construction.

Fig. 2 is an elevational view of the bolt or connecting stem employed in the modifications of the invention shown in Figs. 1, 7 and 8.

Fig. 3 is an elevational view of a nut adapted to be used with the bolt shown in Fig. 2.

Fig. 4 is an enlarged cross-sectional view of the nut of Fig. 3, taken along the line 4—4 looking in the direction indicated, showing the details of the construction thereof.

Fig. 5 is an enlarged fragmentary elevational view of the threaded end of the bolt shown in Fig. 2, which is adapted to co-operate with the nut shown in Fig. 4.

Fig. 6 is an elevational view of the gripping dog used in the modification shown in Fig. 10.

Fig. 7 is an elevational view partially in cross-section, of another embodiment of my invention by which a threaded member may be swiveled on a cable.

Fig. 8 is a general elevational view showing the mechanism illustrated in Fig. 7 screwed firmly into a spark plug hole of a motor, with parts broken away from the motor to show details of the connection, preparatory to lifting the motor by said connection.

Fig. 9 is an elevational view, with parts broken away to show details of construction, of another embodiment of my invention as applied to a pig-tail cable end connection which is particularly useful in making running loops and nooses in cable ends.

Fig. 10 is an elevational view with parts broken away to show features of construction of another embodiment of my invention which is particularly useful in making splices and standing loops and bights of various types in cable ends.

The problem of splicing a cable or connecting it to another cable or of making a running noose or standing loop or bight in a cable in a quick, secure and yet readily removable manner, has been the cause of considerable difficulty. The slightest slipping of a cable in such a cable connection is likely to cause considerable property damage, or result in dangerous personal injuries to persons in the immediate vicinity. A complicated connection, as exemplified by some devices heretofore suggested, however, is too expensive for practical purposes and requires an excessive expenditure of time and labor to attach and remove. And some of the simple connections, as exemplified by other prior devices, are too insecure and dangerous to use in practical work.

Applicant has avoided these objectionable features and difficulties by providing connections that are safe and secure when attached, are relatively simple and interchangeable as to parts, are cheaply and easily manufactured, and may be quickly attached and detached by unskilled labor.

In Fig. 1 is shown a connection between two cable ends 11 and 12. These cable ends may be the portions of a single cable that it is desired to splice or the respective ends of two separate cables.

This connection comprises a stem 13, shown in detail in Fig. 2, upon which is rotatably received a pair of opposed exteriorly threaded sleeves 14, each of which is provided with an exterior prismatic wrench-engaging portion 15, the latter portions being located in adjacent relationship. The stem 13 is provided with an enlarged head 16 integrally formed thereon at one end, and a similar head 17 at the other end thereof, shown in detail in Fig. 3, and preferably threaded onto the stem; the head 17 being cut away on diametrically opposite sides thereof to provide wrench-engaging flats 18 to facilitate threading the head onto the stem. The heads 16 and 17 are preferably so spaced axially of the stem 13 as to maintain the sleeves 14 against substantial axial movement thereon.

On each sleeve 14 is threaded a member 19 similar to a blind nut, the heads 16 and 17 being freely insertable into the corresponding members and being movable by the corresponding sleeves 14 to a point adjacent the blind end of the member.

The blind nut members 19 have a prismatic wrench-engageable surface 21 and a longitudinal axial bore having internal threads 22 in the outer portion of the bore cooperating with the external threads on the respective sleeves. These blind nuts or body members have a secondary bore 23 extending transversely at an angle to the primary bore, the axis of said secondary bore passing through the axis of said primary bore at such an angle that it will provide openings in the end and side wall portions of the non-threaded portions of the primary bore.

A cable end is adapted to extend through each of these two pairs of openings and the sleeves or nipples 14 are then screwed into the body members 19 forcing the heads of the connector stem against the respective cables and clamping them securely against the walls of the bore of the respective body members.

The threads of the sleeves or nipples and of the respective body members may be made of right and left hand pitch respectively so that they may both be turned together, resulting in a turn-buckle action. I, preferably, however, make all the threads right-handed as this simplifies the production of the articles and allows great interchangeability.

The embodiment of my invention shown in Fig. 1 is particularly useful for line splicing cables.

In Fig. 2, I show an illustrative form of connector stem in which a bolt 13 having a frusto-conical head 16, and a shank provided with threads 24 cut exteriorly in the terminal end thereof on which a nut 17 is adapted to be threaded.

While this nut may be of any usual type and while it may be secured to the bolt 13 in any usual manner, it may also be constructed in the manner of nut 17 illustrated in Figs. 3 and 4.

Nut 17 is substantially frusto-conical in shape to match with the head 16 of the bolt 13. Two wrench flats 18 of resulting hyperbolic outline are cut in the surface of the conical portion of the nut to furnish a wrench engaging portion. The nut 17 has a threaded bore 26 cooperating with the threads 24 on the bolt 13 and to the rear of this bore has a chamber portion 27 of a diameter slightly greater than the exterior diameter of the threads. Directly in back of this chamber portion is a reduced portion 28 which forms an annular shoulder 29 which may be any diameter between the root diameter and the external diameter of the threads 24 but is shown here as substantially equal to the pitch diameter. When the bolt 13 is screwed into the nut 17 the threads 24 on the end of the bolt, being forced into contact with the annular shoulder 29, will have their edges so deformed and bent together that the nut will not normally come off the bolt.

In Fig. 7 is shown an embodiment of my invention which is particularly useful for connecting a cable to a member having a screw threaded opening therein. It will be noted that it is substantially the same structure shown in Fig. 1 with the exception that one of the body members has been removed.

The body member 31 is substantially similar to the body members shown in Fig. 1 except that the secondary bore extends in a horizontal plane to provide a pair of spaced reduced openings 32 and 33 leading from the unthreaded portion of the bore to the exterior of the body. A small piece of cable 34 may be formed into a bight and the ends thereof may be passed through the transverse opening. The body member may then be screwed down on the sleeve 14 and the head 35 of bolt 36 will positively clamp the cable end against the surface of the bore of the body member in a secure manner forming a standing loop or bight in the cable.

The sleeve 37 is substantially similar to the sleeve 14 but may be provided with a longer wrench-engaging portion 15 and may be provided with any suitable type of thread to cooperate with the member to be attached to the cable. Three sleeves or nipples similar to nipples or sleeve 37, but having respectively standard S. A. E. threads, standard pipe threads and standard metric threads thereon, will fit the spark plug holes on practically every internal combustion engine in existence. However, additional nipples having threads, or other engaging devices, corresponding to the engaging devices on the object to be lifted may be substituted therefor by merely unscrewing the nut 38 and changing the nipples.

The connector stem 36 is similar to the connector stem 13 shown in Fig. 2 but is made slightly longer to allow the two sleeves to be rotatably retained with enough longitudinal and radial free movement to allow sleeve 37 to swivel freely. The bolt head 35 is cylindrical with a frusto-conical upper surface in order to afford a firmer grip on the cable ends in their new position, and the nut 38 is removably retained on the shank so that the alternate sleeves 37 with their various types of threads and engaging means may be quickly interchanged.

In Fig. 8 the mechanism shown in Fig. 7 is illustrated in use as a motor lift. Sleeve 37 may be firmly screwed into spark plug hole 39 of the motor block 41 and a crane hook, (not shown) or other suitable lifting member may be engaged with the bight or loop of cable 34. As the block 41 is moved around the shop it can be easily swiveled into any desired position because the sleeve or nipple 37 swivels readily on the connector stem 36. This avoids any twisting or tangling of the hoisting apparatus (not shown) in the necessary alignment of the block as it is raised or lowered.

In Fig. 9 is shown a cable end connection similar to that of my Patent No. 1,698,001, issued January 8, 1929. However, there are numerous differences between the two devices.

It will be observed that Fig. 9 is very similar to Fig. 1 with one body member 19, the nut 17, and lower nipple 14 removed and the bolt shank 13 twisted into a pig-tail.

Sleeve 14 is the same as sleeve 14 of Fig. 1. Body member 19 is the same as body member 19 of Fig. 1.

The connector stem 13 is the same as connector stem 13 of Fig. 1 except that the end of the shank instead of being threaded is formed to provide a heavy helical coil 42, preferably having more than one convolution, each convolution being spaced from the adjacent convolution by a distance preferably slightly greater than the diameter of a cable 43.

The mechanism described in Fig. 9 is an illustrative embodiment of my invention particularly adapted to be used to form a running noose or loop for a cable end, by twisting the cable 43 around the convolutions 42 of the pig-tail in the manner described in my prior patent.

In Fig. 10 is shown an illustrative embodiment of my invention particularly useful in forming a standing bight or loop in a cable either longitudinally or transversely to the axis of the cable.

A nipple 14 similar to nipple 14 in Fig. 1 has a dog 44 rotatably inserted in its bore. The dog has a cylindrical head 46 with a conical top surface and a tail extending into the bore of the nipple.

The sleeve with the dog mounted therein may be screwed into a body member 47.

The body member 47 consists of an outer prismatic wrench engaging portion 48, an inner longitudinal bore, the outer portion 49 of which is internally threaded to engage with the external threads on the nipple 14, and has an eccentric semi-axial opening 51 through the rear wall and a large elongated transverse opening 52 through the side wall thereof and a smaller transverse opening 53 through the opposite side wall thereof.

A cable end 54 extends into the axial opening 51 and out through the larger transverse opening 52.

If it is desired to form a bight in a transverse plane, the cable end is then run back in the enlarged transverse opening 52 and out the smaller transverse opening 53 in the position shown in the dotted lines of Fig. 10.

If, however, it is desired to form a bight longitudinally of the axis of the cable, the cable end is then run through the smaller opening 53 and back out through the larger transverse opening 52 instead, in the position shown in the solid lines of Fig. 10.

The nipple 14 is then screwed firmly into the body member 47 the head 46 on the dog 44 firmly clamping the various portions of cable 54 against the interior of the body member in a secure manner forming a standing loop or bight.

While I have shown in the embodiments illustrated in the drawings in Fig. 1 and in Fig. 9 a body member having angular offset axial and transverse openings, in Fig. 7 and Fig. 8 a body member having two enlarged transverse openings, and in Fig. 10, a body member having an eccentric axial opening, and a reduced and an enlarged transverse opening, each in connection with one particular embodiment of my invention, it is obvious that any one of these body members may be exchanged for any other one of the body members depending entirely upon the type of cable connection desired. These body members may be regarded as blind nuts as the nipples cannot be threaded through them. And while the cable ends have all been shown cut off close to the body member, they could obviously be drawn through the body member and clamped in various positions for adjustment with various lengths of cable, and extend out of the body member to various degrees.

By "cable", or "cable end", as used in the specification and claims herein is meant any flexible longitudinal body without regard to its composition or form; as obviously, these cable connections are adapted to be used with any rope, cord, line, wire, or other similar flexible rod or tube.

Among the many advantages of the illustrated embodiments of my invention are the simplicity and ruggedness of construction, the interchangeability of parts, the simplicity and cheapness of manufacture, and the simple and quick manner in which they may be positively and safely secured to the cable and other objects, and the quickness and ease with which they may be removed. The cable openings in the body members are so designed that the cable in passing through the body member is not unnecessarily bent but received in a direction generally that of its axis before entering the body member.

Numerous other advantages will be apparent from the drawings, the preceding specification and the following claims.

While I have shown in the drawings, several particular illustrative forms of my invention, various modifications may be made in the same and in the various features of construction, without materially changing the invention therein, and formal changes may be made in the specific embodiment of the invention described without departing from the spirit or substance of the broad invention, the scope of which is commensurate with the appended claims.

I claim:

1. A cable connection comprising, in combination, a stem member provided at each end with a head, a pair of opposed nipples rotatably received on said stem member and confined between said heads, and a blind nut member threadably engaged on at least one of said nipples, said nut member having an opening therein for the passage of a cable thereinto for engagement with said head.

2. A cable connection comprising, in combination, a stem member provided at each end with a head, a pair of opposed screw sleeves rotatably received on said stem member and confined against axial movement between said heads, and a blind nut member threadably engaged on at least one of said sleeves and having a pair of openings therein for the passage of a cable therethrough.

3. A cable connection comprising, in combination, a stem member provided at each end with a head, a pair of opposed nipples rotatably received on said stem member and confined between said heads, and a blind nut member threadably engaged on at least one of said nipples, said nut member having an aperture therein for the passage of a cable into clamping engagement with the corresponding of said heads.

4. A cable connection comprising, in combination, a stem member provided at each end with a head, a pair of opposed screw sleeves rotatably received on said stem member and confined between said heads, and a blind nut member threadably engaged on each of said sleeves, both of said nut members having an aperture therein for the passage of a cable into clamping engagement with the corresponding of said heads.

5. A cable connection comprising, in combination, a stem member, a head on each end of said stem member provided with a cone-shaped face, a pair of opposed screw sleeves rotatably received on said stem member and confined between said heads, and a blind nut member threadedly engaged on each of said sleeves, each of said nut members being provided with an opening therethrough for the passage of a cable into the interior thereof.

6. A cable connection comprising a stem, a head on said stem provided with a beveled face, a screw collar rotatably encircling said steam and abutting said head, and a blind nut in which said head is received and having its bore threaded for engagement with said sleeve, said nut member being provided with a pair of apertures in the walls thereof for passage of a rope into clamping engagement with said head within said nut.

7. In a cable connection the combination of a sleeve member having a bore, a second substantially similar sleeve, a connector having a shank rotatably extending through said bores, retaining means for said sleeves on each end of said shank, a body member having a wrench engageable portion, said body member and one of said sleeve members having cooperating engaging portions thereon, said body member having a plurality of openings therethrough, and a cable adapted to be clamped in said openings upon relative movement of said engaging portions.

8. In a cable connection the combination of a sleeve member having a wrench-engageable portion, said sleeve having a bore, a second substantially similar sleeve, a connector having a shank rotatably extending through said bores, retaining means for said sleeves on each end of said shank, a body member, said body member and one of said sleeve members having co-operating engaging portions, said body member having a plurality of openings therein, a cable adapted to be clamped in said openings upon relative movement of said engaging portions, and a second substantially similar body member cooperating with the other of said sleeves in a similar manner.

9. In a cable connection the combination of a sleeve member having a wrench-engageable portion, a connector having a shank rotatably extending through the bore of said sleeve, retaining means for said sleeve on said shank, a body member having a wrench engageable portion, said body member and said sleeve member having co-operating engaging portions thereon, said body member having a plurality of openings therein, and a cable adapted to be clamped in said openings upon relative movement of said engaging portions.

10. In a cable connection the combination of a sleeve member having a wrench-engageable portion, a connector having a shank rotatably extending into said sleeve, a body member having a wrench engageable portion, said body member and said sleeve member having co-operating engaging portions thereon, said body member having a plurality of openings therethrough for passage of a cable adapted to be clamped in said openings upon relative movement of said engaging portions.

11. In a cable connection, the combination of a sleeve member having a non-circular wrench engageable exterior portion and an exteriorly threaded portion, a second substantially similar sleeve in axial alignment with the first mentioned sleeve, a shank extending through said sleeves, retaining means for said sleeves on each end of said shank, a body member having a non-circular wrench engageable portion and a threaded bore adapted to co-operate with the external threads on one of said sleeves, said body member having a plurality of openings extending through the walls thereof to receive a cable, and a second substantially similar body member cooperating with the other of said sleeves.

12. In a cable connection, the combination of a sleeve member having a non-circular wrench engageable exterior portion and an exteriorly threaded portion, a second substantially similar sleeve in axial alignment with said first sleeve, a stem extending through said bores, retaining means for said sleeves on each end of said stem, a body member having a non-circular wrench engageable portion, and a threaded bore for co-operation with the external threads on one of said sleeves, said body member having a plurality of openings extending therethrough adapted to receive a cable for engagement with one of said retaining means.

13. In a cable connection, the combination of a pair of sleeve members each having a non-circular wrench engageable exterior portion, and an exteriorly threaded portion, a bolt having a shank extending through said sleeves, retaining means for said sleeves on each end of said shank, a hollow body member having a non-circular wrench engageable portion, and internal threads in the bore of said body member cooperating with the external threads on one of said sleeves, said body member having a plurality of openings extending from the bore thereof to the exterior thereof for the passage of a cable.

14. In a cable connection the combination of a sleeve member having a non-circular wrench engageable portion, and a threaded portion, said sleeve having a bore, a second substantially similar sleeve placed adjacent to said first sleeve, a connector having a shank extending through said bores, sleeve retaining means on each end of said shank, a body member having a non-circular wrench engageable portion, said body member having a threaded portion cooperating with the threads on one of said sleeves, and a plurality of openings therein adapted to receive a cable, and a second substantially similar body member cooperating with the threads of the other of said sleeves.

15. In a cable connection the combination of a sleeve member having a non-circular wrench engageable portion, and a threaded portion, said sleeve having a bore, a second substantially similar sleeve placed adjacent to said first sleeve, a connector having a shank extending through said bores, retaining means on each end of said shank, to retain said sleeves on said shank, a body member having a non-circular wrench engageable portion, said body member having a threaded portion co-operating with the threads on one of said sleeves, said body member having a plurality of openings therein adapted to receive a cable.

16. In a cable connection the combination of a sleeve member having a non-circular wrench engageable exterior portion, and an exteriorly threaded portion, said sleeve having a bore, a second substantially similar sleeve placed relative to said first sleeve, a bolt having a head and a shank, said shank being run through said bores, threads on the end of said shank, a nut having a head threaded on the threads of said shank, a body member having a non-circular wrench engageable portion, said body member having a bore, internal threads in the bore of said body member co-operating with the external threads on one of said sleeves, and said body being provided with a plurality of openings extending from its bore to the exterior thereof adapted to receive a cable, and a second substantially similar body member cooperating with the threads of the other of said sleeves.

RICHARD PARRISH.